United States Patent [19]

Miles et al.

[11] Patent Number: 4,676,351

[45] Date of Patent: Jun. 30, 1987

[54] HYDRAULIC OPERATED CONTROL SYSTEM TO APPLY VEHICLE BRAKES

[75] Inventors: Paul W. Miles, Springfield, Ill.; David F. Carl, Madison, Ala.

[73] Assignee: Fiatallis Europe, S.p.A., Lecce, Italy

[21] Appl. No.: 817,431

[22] Filed: Jan. 9, 1986

[51] Int. Cl.⁴ ............................................. B60K 41/26
[52] U.S. Cl. .................................. 192/4 C; 192/12 C; 192/13 R; 137/625.3
[58] Field of Search ..................... 192/4 C, 4 A, 13 R, 192/0.094, 126, 109 F; 180/6.2, 6.3; 137/625.3

[56] References Cited

U.S. PATENT DOCUMENTS

| | | | |
|---|---|---|---|
| 3,765,454 | 10/1973 | Carl | 137/625.3 X |
| 3,837,449 | 9/1974 | Drone | 192/13 R |
| 4,230,152 | 10/1980 | Carl et al. | 192/13 R X |
| 4,538,641 | 9/1985 | Chatterjea | 192/13 R |

*Primary Examiner*—George H. Krizmanich
*Attorney, Agent, or Firm*—Robert A. Brown

[57] ABSTRACT

A steering control system for applying brakes to engine powered vehicles having power-shifting hydraulic fluid transmissions. An interface value is provided to sense a pressure signal of hydraulic fluid that is proportional to ground speed movement of a vehicle. A control value transforms the signal generated by fluid pressure into associative structure for applying vehicle brakes in a manner proportional to vehicle ground speed, either in a forward or reverse direction. Dual pressure regulating valves are provided wherein one value is set at a higher pressure than the other values for eliminating a need for two sources of pressure and/or a pressure accumulator.

12 Claims, 1 Drawing Figure

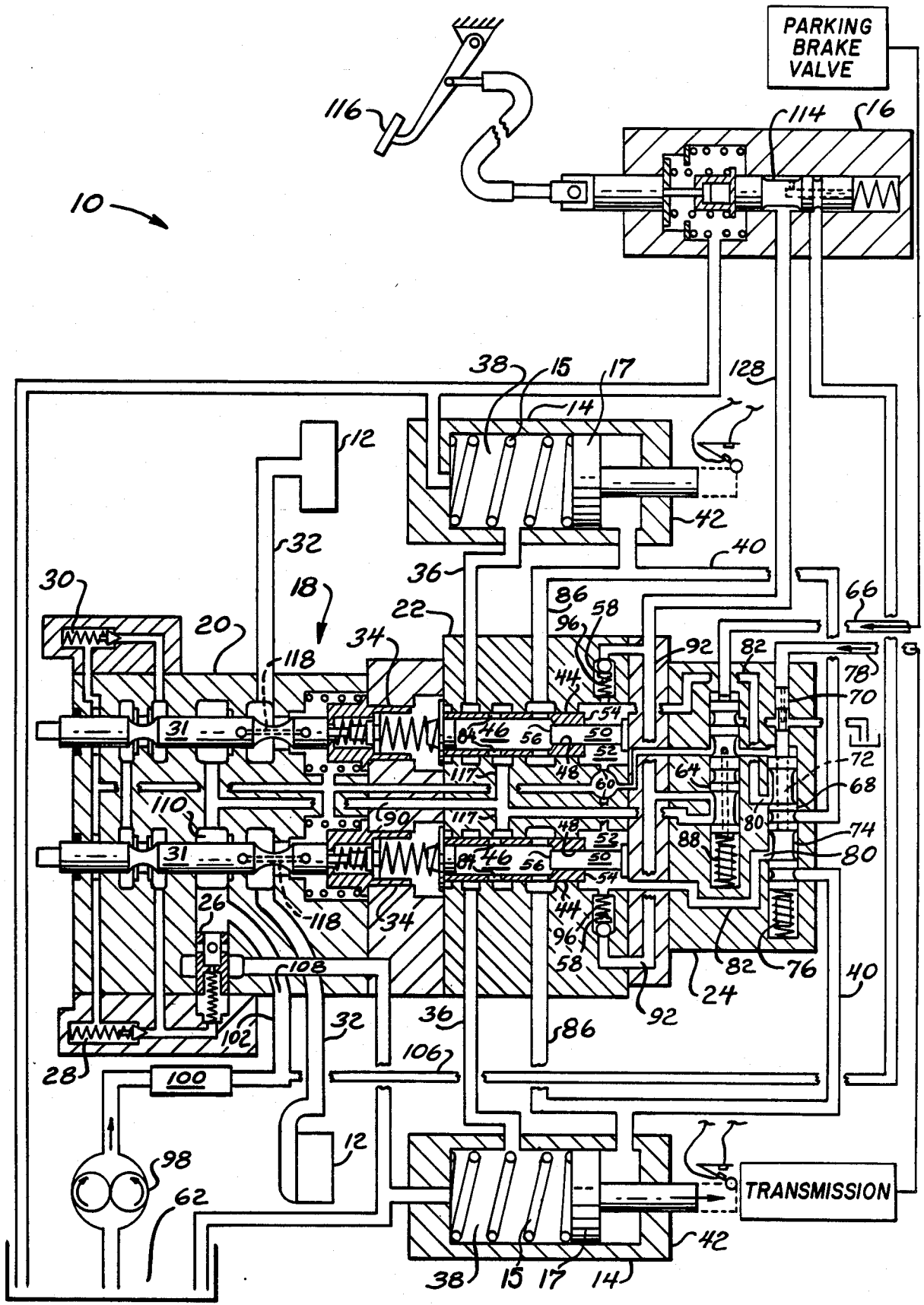

4,676,351

HYDRAULIC OPERATED CONTROL SYSTEM TO APPLY VEHICLE BRAKES

BACKGROUND OF THE INVENTION

This invention relates generally to engine powered vehicles having power shifting, hydraulic fluid transmissions and more particularly to systems for applying vehicle brakes. Means is provided to sense a pressure signal of hydraulic fluid that is proportional to ground speed movement of a vehicle. Control means transforms the signal generated by fluid pressure into means for applying vehicle brakes in a manner proportional to vehicle ground speed, either in a forward or reverse direction. Dual pressure regulating means are provided wherein one means is set at a higher pressure than the other means for eliminating a need for two sources of pressure and/or a pressure accumulator.

For convenience of illustration, the invention will be described with reference to its use in a steering and brake control system for construction machinery, such as a crawler tractor, but it is believed to be applicable and have general utility in any steering-by-driving vehicle.

Control of braking and steering systems used in large steering-by-driving vehicles, such as crawler tractors, has been for many years a main concern of engineers and other technical persons skilled in the art. A great many examples of systems and apparatus to solve problems in this field of use have been disclosed in a number of prior art patents. Two attempts to solve these problems may be found in U.S. Pat. Nos. 3,765,454, issued on Oct. 16, 1973 in the name of David F. Carl and U.S. Pat. No. 3,837,449, issued on Sept. 24, 1974 in the name of Gary A. Drone, both patents assigned to the assignee of the present invention. The first named reference is concerned primarily with modulating the rise of pressure in fluid directed to a steering clutch. The second named reference is directed to structure that automatically applies a vehicle brake when transmission fluid pressure drops because of shifting to neutral or the engine stops.

U.S. Pat. No. 4,230,152, issued on Oct. 28, 1980 in the name of Carl, et al, a multi-function control valve discloses a hollow, ported valve spool movable in response to selective operation of a manually actuated valve spool to effect flow modulation from a first fluid source through the valve. One end of the hollow, ported valve spool engages a plug portion of a freely floating piston movable in response to fluid pressure from a second fluid source to close a normally open port in the hollow, ported valve spool.

While D. F. Carl, et al, U.S. Pat. No. 4,230,152 discloses a control valve system for braking vehicles that is highly satisfactory for steering-by-driving applications, it relies on pressure applied by a foot operated pedal to move a piston within a spool valve to shut off fluid pressure. In addition, there is required a dual pump structure in order to provide a first fluid flow through the valve and a second fluid source to communicate fluid to a small spool in order to shut off fluid pressure. Further, this structure is complicated in that there are too many interfaces that can cause mixing of steering and transmission fluids. In addition, this system fails to provide for means to accomplish proportional braking.

SUMMARY OF THE INVENTION

Accordingly, it is an object of the present invention to provide a control system that modulates the application of vehicle brakes by receiving pressure signals generated in hydraulic fluid of a vehicle transmission when shifted from one direction to another.

Another object of this invention is to provide a control system wherein the application of vehicle brakes is regulated by pressure acting on proportionally related large and small surface areas of reciprocable spool means to establish a condition of equilibrium.

An additional object of this invention is to provide a multi-function control valve that is effective to apply vehicle brakes based upon pressure signals received from a vehicle transmission when the transmission is shifted to cause directional travel reversals of the vehicle.

It is a further object of the present invention to provide a control system that receives a pressure signal generated by hydraulic fluid in a vehicle transmission and transforms this signal to apply vehicle brakes based upon vehicle ground speed during either a forward or a reverse direction.

Another object of this invention is to provide brake control means wherein regulated pressure acts on combined areas of large and small spool means during actuation of foot operated brake means.

An additional object of this invention is to provide interface structure within brake application means so that pressure acting therein is proportional to a signal generated by vehicle speed during vehicle travel reversals.

A further object of this invention is to provide a control system wherein one regulator means is set to operate at a higher pressure than another regulator means so that only a single pressure source is required to operate the control system.

These and other objects are attained in accordance with the present invention wherein there is disclosed a control system for applying vehicle brakes including a multi-function control valve comprising a steering clutch section including slidable spool means for operating steering clutches of a vehicle, a brake actuator section including slidable spool means for operating brake cylinders of the vehicle, an interface valve section including reciprocable spool means for receiving pressure signals generated in hydraulic fluid of the vehicle transmission when the transmission is shifted to change the direction of travel of the vehicle, means connecting the interface valve spool means with the slidable spool means of the brake actuator section, selectively related surface areas associated with the brake actuator spool valves and stationary pistons, whereby pressurized fluid acting against the surface areas causes the vehicle brakes to be applied at a preselected minimal shock force.

DESCRIPTION OF THE DRAWING

Further objects of the invention together with additional features contributing thereto and advantages accruing therefrom will be apparent from the following description of a preferred embodiment of the invention, which is shown in the accompanying drawing with like reference numerals indicating corresponding parts throughout, wherein:

The drawing is a sectional view with portions schematically diagrammed of a steering control system for an engine powered vehicle including steering clutches, brake control motors, a brake control valve and a multi-function control valve for utilizing a signal generated by the vehicle transmission to proportionally apply the vehicle brakes during forward and reversal movements thereof.

DESCRIPTION OF A PREFERRED EMBODIMENT

Referring now to the drawing, there is illustrated a schematic view of a steering control system for an engine powered vehicle (not shown) generally identified by reference numeral 10. The system includes a plurality of steering clutches 12, a plurality of brake actuator motors or cylinders 14, at least one brake control valve 16, and a multi-function control valve identified generally by reference numeral 18 for controlling the flow and pressure of fluid in a fluid operated system.

The multi-function control valve 18 includes a steering clutch section 20, a brake actuator section 22, and an interface valve section 24, wherein are provided ports, fluid passageways, chambers and bored openings for receiving operating mechanisms, such as valve spools, control springs, pistons and the like.

The steering clutch section 20 includes a main regulator valve 26, a first pilot regulator valve 28 operable at approximately 500 psi, a second pilot regulator valve 30 set to open at approximately 260 psi and a plurality of steering clutch spools 31 adaptable to be movable rectilinearly in response to control linkages as directed by an operator of the vehicle. The steering spools 31 are adaptable during movement to at times direct pressurized fluid through steering clutch conduits 32 to the steering clutches 12 for selective operation thereof.

The brake actuator section 22 comprises a plurality of spring loaded, slidable brake spools 34 suitably connected respectively to the steering clutch spools adaptable to move in a unitary manner therewith. The brake actuator spools 34 are effective at times to selectively direct pressurized fluid either through head end conduits 36 to head end chambers 38 of brake actuator cylinders 14 or through rod end conduits 40 to rod ends 42 of brake actuator cylinders 14 and thereby apply or release the vehicle brakes. The brake spools 34 further include slidable down regulator valves 44 having a plurality of ports adaptable to suitably connect pressurized fluid to the head or rod ends of the brake cylinders 14.

The down regulator valves 44 each have formed therein a chamber 46 for receiving pressurized fluid at approximately 220 psi. The down regulator valves also have formed at one of their ends bores 48 adaptable to receive and slide over stationary pistons 50 secured within equilibrium chambers 52. The right side end of each down regulator valve 44 has a surface area 54 exposed to the pressure in each equilibrium chamber 52 and the left side end of each stationary piston 50 has a surface area 56 exposed to pressure in each down regulator valve chamber 46. The surface area 54 of each down regulator valve 44 and the surface area 56 of each stationary piston 50 are each calculated and relatively sized to bear a preselected relationship to each other for a purpose to be hereinafter explained in more detail.

Spring loaded check valves 58 are disposed adjacent the equilibrium chambers 52 adaptable to permit flow of fluid into the chambers 52, but prevent fluid from flowing thereout. Orifices 60 are disposed in the chambers 52 for permitting a restrictive flow of fluid to a system reservoir or sump 62 exposed to atmosphere.

The interface valve section 24 includes a spring loaded parking brake spool 64 adaptable to move selectively so as to divert fully pressurized system fluid as signaled through a parking brake conduit 66 by a parking brake valve (not shown) to equilibrium chambers 52 in order to actuate the brake actuator cylinders and positively set the vehicle brakes into an "on" position during the time the vehicle is at rest or in a parked position. The interface valve section 24 further includes a slidable brake assist spool 68 comprising an upper end portion 70, an orifice 72, a lower end portion 74, and spring 76 for biasing the brake assist spool 68 in a manner as will be hereinafter explained in greater detail. The brake assist spool 68 is connected by a transmission conduit 78 to a transmission valve (not shown) and is adaptable to move in response to pressure signals received from the transmission valve, such as when the vehicle transmission is directionally changed from forward to reverse, or vice versa.

Whenever the transmission undergoes a directional change, there is caused an increase in pressure in the transmission conduit 78 that is transmitted to the upper end portion 70 of the brake assist spool 68 moving the spool 68 downwardly against the bias of spring 76. As the spool moves downwardly, ports 80 of the interface valve section 24 connect rod end conduits 40 of the brake actuator cylinders 14 to interface conduits 82 that are connected to equilibrium chambers 52. The increased fluid pressure in equilibrium chambers 52 acts against the surfaces 54 of down regulator valves 44 and causes them to move leftwardly. This action in turn initiates a partial closing of the main supply of pressurized fluid at ports 84 of the down regulator valves 44 and causes some fluid to flow through conduits 36 to the sump 62. As fluid is diverted to sump, the pressure in down regulator chambers 46 decreases and causes a pressure drop in down regulator branches 86 of the rod end conduits 40. This pressure drop in turn loops back to ports 80 of the brake assist spool 68 and subsequently is transmitted through interface conduits 82 to the back surfaces 54 of the down regulator valves 44. The down regulator valves 44 will continue to slide back and forth over stationary pistons 56 until such time as there is achieved an equilibrium position. The equilibrium position is achieved by the pressure in down regulator valve chambers 46 acting against surface areas 56 of stationary pistons 50 creating forces equal to the forces created by the pressure in equilibrium chambers 52 acting against the surface areas 54 of the back sides of down regulator valves 44.

The relationship between the surface areas 56 of the stationary pistons 50 and the surface areas 54 of the down regulator valves 44 is selectively predetermined so as to permit the application of vehicle brakes at a preselected force in order to obtain the best possible comfort for an operator of the vehicle and thereby avoid what is commonly referred to as "shift shock." A preferred relationship between the surface areas 56 and surface areas 54 is in the order of one to four (1:4).

Referring again to the parking brake spool 64 of interface valve 24, it will be noted the brake spool 64 is biased upwardly by a spring 88 so as to permit pressurized fluid from a main conduit 90 to be bypassed through an interface conduit 92 to exert pressure against check valves 58 and their springs 96 normally holding the check valves 58 in closed positions. However, the pressure from the main conduit is sufficient to open the check valves 58 and permit fluid pressure to be exerted against the surfaces 54 of the down regulator valves 44 and move them leftwardly. The leftward movement of the valves 44 causes ports 84 to be positioned so as to permit fluid from the rod sides of brake cylinders 14 to flow to sump. Under these conditions, springs 15 of the brake cylinders 14 bias the pistons into position to cause the vehicle brakes to be applied or placed in an "on" position.

Whenever the parking brake spool 64 receives a pressure signal as by fluid directed to it from a parking brake valve (not shown), the pressurized fluid causes the parking brake spool 64 to overcome the force of its spring 88 and move downwardly. This movement shuts off the flow between main conduit 90 and interface conduit 92 permitting check valves 58 to close causing the pressure to drop in equilibrium chambers 52.

The spring biased down regulator valves 44 move rightwardly and because orifices 60 are connected to sump, the residual pressure in equilibrium chambers 52 is reduced to zero and the fluid therein flows to sump. The movement of the down regulator valves 44 permits fluid to flow through rod side conduits 40 to the rod sides of brake cylinders 14 and overcomes the force of springs 15 and thereby release or place the vehicle brakes in an "off" position.

A positive displacement pump 98, operated by the engine of the vehicle, provides pressurized fluid through a filter 100, a first portion of the fluid being directed through a conduit 102 to the steering clutch section 20, and a second portion of the fluid being directed by means of a hydraulic line 106 to the brake control valve 16. The fluid, pressurized by the pump 98 to about 500 psi enters the clutch section 20 through an entrance port 108 exerting pressure within a main chamber 110 about slidable steering clutch spools 31 and against the spring loaded, main regulator valve 26. Simultaneously, the second portion of fluid directed to the brake control valve 16 is blocked thereat by a slidable spool member 114 disposed within the brake control valve 16 that is selectively operable by a foot pedal 116 as controlled by the operator of the vehicle. The pressure in main chamber 110 is directed further into the main conduit 90 which branches into down regulator conduits 117 that connect with and provide a constant supply of fluid to the chambers 46 of the down regulator valves 44.

The main conduit 90 is also connected to the interface conduit 92 and supplies fluid thereto unless blocked off by the movement of the parking brake spool 64. The main regulator valve 26 directs fluid to both the first pilot regulator valve 28 and the second pilot regulator valve 30 which are set to operate respectively at about 500 psi and 260 psi. The force of pressure in down regulator valve chambers 46 at about 225 psi causes the plurality of slidable down regulator spool members 44 to move so as to permit fluid to flow through conduits 86 to the rod sides of the brake actuator cylinders 14. The pressure of the fluid on the rod sides of the brake actuators is effective to counteract the force of springs 15 applied against pistons 17 of the actuators and move the vehicle brakes to an "off" position. The vehicle is then able to move in either a forward or reverse direction.

When steering clutch spools 31 and brake actuator spools 34 are moved leftwardly, as for example, by an operator of the vehicle through the manual manipulation of control lever (not shown) connected through control linkages (not shown) to spools 31, fluid will flow from the main chamber 110 through metering slots 118 to the steering clutch conduits 32 and to the steering clutches 12. Simultaneously, fluid is released to sump from the head end chambers 38 of the brake actuators 14. The amount of travel of the steering and brake spool equals about 0.60 inches of rectilinear movement.

Depressing the foot pedal 116 of the brake control valve 16 causes the brake control spool member 114 to move rightwardly so as to gradually permit the flow of fluid through an exit conduit 128 and connect with the interface conduit 92 of interface valve 24. As the pressure increases in exit conduit 128 and interface conduit 92, the check valves 58 will open and pressure is exerted against the surfaces 54 of the down regulator valves 44. This causes the pressure in equilibrium chambers 52 gradually to drop to 0 psi.

As the pressure of fluid in equilibrium chambers 52 gradually reduces to 0 psi, the brake actuator cylinders move proportionally to apply the brakes and modulate into full force brake application at 0 psi.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A control system for applying brakes to an engine powered vehicle having a power-shifting hydraulic transmission comprising pump means connecting reservoir means to said control system for supplying pressurized fluid thereto and for operation thereof, steering spool means disposed within said control system for selectively directing a portion of said pressurized fluid to steering clutch means for selective operation thereof, brake actuator spool means disposed within said control system for selectively directing a portion of said pressurized fluid to brake actuator cylinders for selective operation thereof, interface valve spool means disposed within said control system adaptable to receive variable pressure signals generated in hydraulic fluid of said transmission when the transmission is shifted to change direction of travel of the vehicle, means connecting said interface spool means to said brake actuator spool means for transmittal of said pressure signals to said brake actuator spool means, and selectively proportional means disposed within said brake actuator spool means for receiving variable ones of said pressure signals for adjustably positioning said brake actuator spool means, whereby said brakes are applied so as to minimize shock forces caused during transmission shifting for effecting directional changes of the vehicle.

2. A control system as claimed in claim 1 wherein said selectively proportional means comprises a first surface formed on a portion of said brake actuator spool means for receiving pressure signals from said transmission, a second surface formed on a stationary piston associated with said brake actuator means for receiving pressurized fluid from said pump means, said first and said second surfaces having respective areas selectively related and proportional to each other, said first and said second surfaces when receiving pressure signals from said transmission and pressurized fluid from said pump means being effective to cause the brake actuator spool means to achieve an equilibrium position for applying brakes of the vehicle.

3. A control system as claimed in claim 1 wherein said selectively proportional means comprises said brake actuator spool means having a surface area formed on a portion thereof for receiving pressure signals from said transmission, stationary piston means having a surface area formed on an end portion thereof for receiving pressurized fluid from said pump means, said surface area of said brake actuator spool means and said surface area of said piston being selectively related and proportional to each other, said spool means surface area and said piston means surface area when receiving pressure signals from said transmission being effective to cause the brake actuator spool means to achieve an equilibrium position for applying brakes of the vehicle.

4. A control system as claimed in claim 2 wherein said first and second surfaces have areas related to each other in the order of four to one.

5. A control system as claimed in claim 2 wherein said interface valve spool means comprises, brake assist spool means connected to said transmission for rectilinear movement in response to said pressure signals received therefrom, spring means biasing said brake assist spool means toward a normally closed position, said brake assist spool means when receiving pressure signals from said transmission being effective to overcome bias force of said spring means and direct pressurized fluid to said surface area of said brake actuator spool means for applying the vehicle brakes.

6. A control system as claimed in claim 1 wherein said interface valve spool means comprises, spring biased parking brake spool means connected to a parking brake valve for receiving pressure signals therefrom, said parking brake spool means connected to said selectively proportional means disposed within said brake actuator spool means for directing pressurized fluid from said pump means to equilibrium chamber means, normally closed check valve means interposed between said brake spool means and said equilibrium chamber means, said pressurized fluid from said pump means opening said check valve means and acting against surface area means of said brake actuator means, said parking brake spool means when directing said pressurized fluid against said surface area means of said brake actuator means being effective to apply the vehicle brakes.

7. A control system as claimed in claim 1 wherein said interface valve spool means comprises, spring biased parking brake spool means connected to a parking brake valve for receiving pressure signals therefrom, said parking brake spool means connected to said selectively proportional means disposed within said brake actuator spool means for directing pressurized fluid from said pump means to equilibrium chamber means, normally closed check valve means interposed between said brake spool means and said equilibrium chamber means, said pressurized fluid from said pump opening said check valve means and acting against surface area means of said brake actuator means, said parking brake spool when receiving pressure signals from said parking brake valve adaptable to overcome its spring bias and stop flow of fluid to said surface area means of said brake actuator means permitting said check valve means to close and thereby release the vehicle brakes.

8. A multifunction control valve for selective operation of brakes of an engine powered vehicle having a power-shifting hydraulic transmission and pump means providing pressurized fluid to the control valve, said control valve comprising a housing, said housing including clutch section means and brake section means, said clutch section means comprising main regulator valve means connected to said pump means, first regulator valve means operable at a first pressure level, second regulator valve means operable at a second lower pressure level, and rectilinearly movable clutch spool means connected to operator controlled linkage means for selective steering of the vehicle, rectilinearly movable brake spool means disposed within said brake section connected to said clutch spool means for unitary movement therewith, and selectively proportional regulating means disposed within said brake section for receiving a constant supply of pressurized fluid and thereafter directing portions thereof to head end and rod end sides of actuator cylinders of the vehicle brakes, whereby movement of the clutch spool means and brake spool means directs fluid to the head end sides of the actuator cylinders to apply the vehicle brakes and to the rod end sides of the actuator cylinders to release the vehicle brakes.

9. A multifunction control valve as claimed in claim 8 comprising interface valve means adaptable to receive variable pressure signals generated in hydraulic fluid of said transmission when the transmission is shifted to change direction of travel of the vehicle, whereby said interface valve means is effective when receiving said variable pressure signals to apply or release the brakes so as to minimize shock forces caused during transmission shifting of the vehicle to achieve directional changes thereof.

10. A multifunction control valve as claimed in claim 9 wherein said selectively proportional regulating means comprises a first surface formed on an end portion thereof for receiving said variable pressure signals generated in the transmission fluid, a second surface formed on an end portion of a stationary piston for receiving fluid pressure from said pump means, said first and said second surfaces having respective areas selectively related and proportional to each other, said first and said second surfaces when receiving pressure signals from said transmission and said pump means being effective to cause the regulating means to assume a position of equilibrium for applying and releasing the vehicle brakes.

11. A multifunction control valve as claimed in claim 10 wherein said first surface and said second surface have areas related to each other in the order of substantially four to one.

12. A control system as claimed in claim 1 comprising foot operated brake means receiving pressurized fluid from said pump means and connected to said brake actuator spool means, said foot operated brake means when depressed being effective to divert fluid to a chamber of said brake actuator spool means and gradually reduce pressure in said chamber to zero pressure so as to achieve full force application of the vehicle brakes.

* * * * *